(12) United States Patent
He et al.

(10) Patent No.: US 9,591,211 B2
(45) Date of Patent: Mar. 7, 2017

(54) PHOTOGRAPHING METHOD AND APPARATUS

(71) Applicant: Huawei Technologies Co., Ltd., Shenzhen, Guangdong (CN)

(72) Inventors: Zhen He, Shenzhen (CN); Jilin Liu, Shenzhen (CN); Tengyue Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 272 days.

(21) Appl. No.: 14/458,903

(22) Filed: Aug. 13, 2014

(65) Prior Publication Data
US 2015/0002696 A1   Jan. 1, 2015

Related U.S. Application Data

(63) Continuation of application No. PCT/CN2013/084533, filed on Sep. 27, 2013.

(30) Foreign Application Priority Data

May 10, 2013   (CN) .......................... 2013 1 0172359

(51) Int. Cl.
*H04N 5/228* (2006.01)
*H04N 5/232* (2006.01)

(52) U.S. Cl.
CPC ..... *H04N 5/23222* (2013.01); *H04N 5/23293* (2013.01)

(58) Field of Classification Search
CPC ................................. H04N 5/23222
USPC ....................................................... 348/222.1
See application file for complete search history.

(56) References Cited

U.S. PATENT DOCUMENTS

| | | | |
|---|---|---|---|
| 2011/0090369 A1* | 4/2011 | Yanagita | H04N 1/56 348/234 |
| 2012/0287310 A1* | 11/2012 | Fujii | G03B 7/093 348/239 |
| 2013/0021487 A1* | 1/2013 | Ishino | H04N 5/23222 348/220.1 |

FOREIGN PATENT DOCUMENTS

| | | |
|---|---|---|
| CN | 101193206 A | 6/2008 |
| CN | 101625505 A | 1/2010 |
| CN | 101646017 A | 2/2010 |
| JP | 2008109552 A  * | 5/2008 |

* cited by examiner

*Primary Examiner* — Anthony J Daniels
(74) *Attorney, Agent, or Firm* — Leydig, Voit & Mayer, Ltd.

(57) ABSTRACT

The present invention discloses a photographing method. The method includes: determining a photographed object in a viewing frame; obtaining characteristic information of the photographed object, where the characteristic information is used to indicate a type of the photographed object; analyzing a behavioral parameter of the photographed object and an environmental parameter in the viewing frame, where the behavioral parameter is used to indicate a behavior type and a behavior speed of the photographed object, and the environmental parameter is used to indicate a color condition and/or a light condition in the viewing frame; determining a photographing parameter that corresponds to the characteristic information, the behavioral parameter, and the environmental parameter; and photographing the photographed object according to the photographing parameter.

15 Claims, 5 Drawing Sheets

PHOTOGRAPHING METHOD AND APPARATUS

CROSS-REFERENCE TO RELATED APPLICATIONS

This application is a continuation of International Patent Application No. PCT/CN2013/084533, filed on Sep. 27, 2013, which claims priority to Chinese Patent Application No. 201310172359.2, filed on May 10, 2013, both of which are hereby incorporated by reference in their entireties.

TECHNICAL FIELD

The present invention relates to the field of digital image processing, and in particular, to a photographing method and apparatus.

BACKGROUND

Currently, there are more electronic devices with a photographing function, for example, a mobile phone, a tablet computer, and a camera. People can photograph anytime and anywhere. During photographing, a user may not know when to photograph a target object because different people have different photographing skills. For example, when a user watches a sunrise, because the sunrise lasts a long time, the user does not know how to take a best photograph of the sunrise. As a result, although the user takes a lot of photographs, the user still does not get a nice photograph of the sunrise. For another example, when a user wants to take a photograph of friends who jump and bend their knees, the user needs to snap a photograph of the friends when they jump to a highest point. However, because the user cannot grasp a good shooting moment and exposure time, after the friends jump for several times, the user still does not snap a photograph at a moment when the friends jump to the highest point.

To overcome the foregoing problem, in the prior art, a technical solution for capturing a picture from a video is provided, where a user can first shoot a photographed object to obtain a video recording of the photographed object, and then obtain, from the video recording, a momentary image that is not easily snapped by taking a screenshot. The user may also capture the momentary image when shooting the photographed object.

In the process of implementing the foregoing photographing, the inventor finds that the prior art has at least the following problems: Regardless of whether a momentary image is captured in a process of making a video recording or watching a video recording, the captured momentary image is a frame of the video recording, and thereby the captured frame has a lower resolution than a frame of a normal photograph. In addition, storage space occupied by a video recording is several times storage space occupied by a photograph, and thereby too much storage space is occupied.

SUMMARY

The present invention provides a photographing method and apparatus, which can solve a problem that, when a momentary image is obtained by taking a screenshot, the obtained momentary image has a low resolution and occupies too much storage space.

According to a first aspect, the present invention provides a photographing method, including:

determining a photographed object in a viewing frame;

obtaining characteristic information of the photographed object, where the characteristic information is used to indicate a type of the photographed object;

analyzing a behavioral parameter of the photographed object and an environmental parameter in the viewing frame, where the behavioral parameter is used to indicate a behavior type and a behavior speed of the photographed object, and the environmental parameter is used to indicate a color condition and/or a light condition in the viewing frame;

determining a photographing parameter that corresponds to the characteristic information, the behavioral parameter, and the environmental parameter; and photographing the photographed object according to the photographing parameter.

In a first possible implementation manner of the first aspect, the determining a photographed object in a viewing frame includes:

focusing on an object in the viewing frame; and determining a profile of the photographed object according to a focusing result.

In the first aspect or the first possible implementation manner of the first aspect, a second possible implementation manner of the first aspect is further provided, and in the second possible implementation manner of the first aspect, the obtaining characteristic information of the photographed object includes:

selecting a characteristic point in the profile of the photographed object;

searching, according to the characteristic point, a first preset database for an object type that corresponds to a layout characteristic and proportion of the characteristic point; and determining the object type as the type of the photographed object.

In the first aspect or the first possible implementation manner or the second possible implementation manner of the first aspect, a third possible implementation manner of the first aspect is further provided, and in the third possible implementation manner of the first aspect, the analyzing a behavioral parameter of the photographed object includes:

determining a contrast photographed object in a most recent viewing frame;

obtaining a profile of the contrast photographed object;

comparing the profile of the contrast photographed object with the profile of the photographed object to obtain a profile change trend of the photographed object; and determining the behavioral parameter from a second preset database according to the type of the photographed object and the change trend.

In the first aspect or the first possible implementation manner, the second possible implementation manner, or the third possible implementation manner of the first aspect, a fourth possible implementation manner of the first aspect is further provided, and in the fourth possible implementation manner of the first aspect, the photographing parameter includes any one of the following parameters:

a shutter speed, an aperture size, a light sensitivity, and a white balance parameter.

In the first aspect or the first possible implementation manner, the second possible implementation manner, the third possible implementation manner, or the fourth possible implementation manner of the first aspect, a fifth possible implementation manner of the first aspect is further provided, and in the fifth possible implementation manner of the first aspect, the analyzing an environmental parameter in the viewing frame includes:

performing a histogram analysis on content in the viewing frame to obtain a color parameter of the content, where the color parameter includes any one of the following parameters: a color saturation and a color uniformity; and the determining a photographing parameter that corresponds to the characteristic information, the behavioral parameter, and the environmental parameter includes:

determining the photographing parameter according to the color parameter, where the photographing parameter includes any one of the following parameters: an exposure compensation, a photographing mode, and a contrast ratio.

In the first aspect or the first possible implementation manner, the second possible implementation manner, the third possible implementation manner, the fourth possible implementation manner, or the fifth possible implementation manner of the first aspect, a sixth possible implementation manner of the first aspect is further provided, and in the sixth possible implementation manner of the first aspect, the method further includes:

when the profile of the photographed object in the viewing frame moves, determining the photographed object in the viewing frame, obtaining the characteristic information of the photographed object, analyzing the behavioral parameter and the environmental parameter of the photographed object, and determining the photographing parameter that corresponds to the characteristic information, the behavioral parameter, and the environmental parameter.

In the first aspect or the first possible implementation manner, the second possible implementation manner, the third possible implementation manner, the fourth possible implementation manner, the fifth possible implementation manner, or the sixth possible implementation manner of the first aspect, a seventh possible implementation manner of the first aspect is further provided, and in the seventh possible implementation manner of the first aspect, the method further includes:

if the profile of the photographed object is beyond the viewing frame, displaying prompt information, so that a user adjusts an angle of view and a coverage of the viewing frame according to the prompt information.

In the first aspect or the first possible implementation manner, the second possible implementation manner, the third possible implementation manner, the fourth possible implementation manner, the fifth possible implementation manner, the sixth possible implementation manner, or the seventh possible implementation manner of the first aspect, an eighth possible implementation manner of the first aspect is further provided, and in the eighth possible implementation manner of the first aspect, the method further includes:

storing, in the second preset database, a correspondence between the characteristic information, the behavioral parameter, and the environmental parameter, and the photographing parameter.

According to a second aspect, the present invention further provides a photographing apparatus, including:

an identifying unit, configured to determine a photographed object in a viewing frame;

an obtaining unit, configured to obtain characteristic information of the photographed object determined by the identifying unit, where the characteristic information is used to indicate a type of the photographed object;

an analyzing unit, configured to analyze a behavioral parameter of the photographed object and an environmental parameter in the viewing frame, where the behavioral parameter is used to indicate a behavior type and a behavior speed of the photographed object, and the environmental parameter is used to indicate a color condition and/or a light condition in the viewing frame;

a determining unit, configured to determine a photographing parameter that corresponds to the characteristic information obtained by the obtaining unit and the behavioral parameter and the environmental parameter analyzed by the analyzing unit; and a photographing unit, configured to photograph the photographed object according to the photographing parameter determined by the determining unit.

In a first possible implementation manner of the second aspect, the identifying unit includes:

a focusing subunit, configured to focus on an object in the viewing frame; and a first determining subunit, configured to determine a profile of the photographed object according to a focusing result of the focusing subunit.

In the second aspect or the first possible implementation manner of the second aspect, a second possible implementation manner of the second aspect is further provided, and in the second possible implementation manner of the second aspect, the obtaining unit includes:

a selecting subunit, configured to select a characteristic point in the profile of the photographed object;

a searching subunit, configured to search, according to the characteristic point selected by the selecting subunit, a first preset database for an object type that corresponds to a layout characteristic and proportion of the characteristic point; and a second determining subunit, configured to determine the object type searched by the searching subunit as the type of the photographed object.

In the second aspect or the first possible implementation manner or the second possible implementation manner of the second aspect, a third possible implementation manner of the second aspect is further provided, and in the third possible implementation manner of the second aspect, the analyzing unit includes:

an identifying subunit, configured to determine a contrast photographed object in a most recent viewing frame;

an obtaining subunit, configured to obtain a profile of the contrast photographed object determined by the identifying subunit;

a comparing subunit, configured to compare the profile of the contrast photographed object obtained by the obtaining subunit with the profile of the photographed object obtained by the obtaining unit to obtain a profile change trend of the photographed object; and a third determining subunit, configured to determine the behavioral parameter from a second preset database according to the type of the photographed object determined by the second determining subunit and the change trend determined by the comparing subunit.

In the second aspect or the first possible implementation manner, the second possible implementation manner, or the third possible implementation manner of the second aspect, a fourth possible implementation manner of the second aspect is further provided, and in the fourth possible implementation manner of the second aspect, the analyzing unit is further configured to perform a histogram analysis on content in the viewing frame to obtain a color parameter of the content, where the color parameter includes any one of the following parameters: a color saturation and a color uniformity; and the determining unit is further configured to determine the photographing parameter according to the color parameter analyzed by the analyzing unit, where the photographing parameter includes any one of the following parameters: an exposure compensation, a photographing mode, and a contrast ratio.

In the second aspect or the first possible implementation manner, the second possible implementation manner, the third possible implementation manner, or the fourth possible implementation manner of the second aspect, a fifth possible implementation manner of the second aspect is further provided, and in the fifth possible implementation manner of the second aspect, the identifying unit is further configured to determine the photographed object in the viewing frame when the profile of the photographed object in the viewing frame moves.

In the second aspect or the first possible implementation manner, the second possible implementation manner, the third possible implementation manner, the fourth possible implementation manner, or the fifth possible implementation manner of the second aspect, a sixth possible implementation manner of the second aspect is further provided, and in the sixth possible implementation manner of the second aspect, the apparatus further includes:

a displaying unit, configured to display prompt information when the profile of the photographed object is beyond the viewing frame, so that a user adjusts an angle of view and a coverage of the viewing frame according to the prompt information.

In the second aspect or the first possible implementation manner, the second possible implementation manner, the third possible implementation manner, the fourth possible implementation manner, the fifth possible implementation manner, or the sixth possible implementation manner of the second aspect, a seventh possible implementation manner of the second aspect is further provided, and in the seventh possible implementation manner of the second aspect, the apparatus further includes:

a storing unit, configured to store, in the second preset database, correspondence between the characteristic information, the behavioral parameter, and the environmental parameter, and the photographing parameter, where:

the storing unit is further configured to store the first preset database.

By using a photographing method and apparatus provided in the present invention, before photographing, a photographed object can be determined in a viewing frame, characteristic information of the photographed object is obtained, a behavioral parameter of the photographed object and an environmental parameter in the viewing frame are analyzed, a photographing parameter that corresponds to the behavioral parameter of the photographed object and the environmental parameter in the viewing frame is determined, and photographing is performed according to the photographing parameter. In the prior art, because content in the viewing frame cannot be identified, the photographed object cannot be identified. In the present invention, a momentary image is recorded in a photograph manner, and a photograph obtained by photographing can save storage space compared with a recording in the prior art. In addition, the photograph obtained by photographing has a higher resolution than a frame, and thereby definition of the photograph is further improved.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
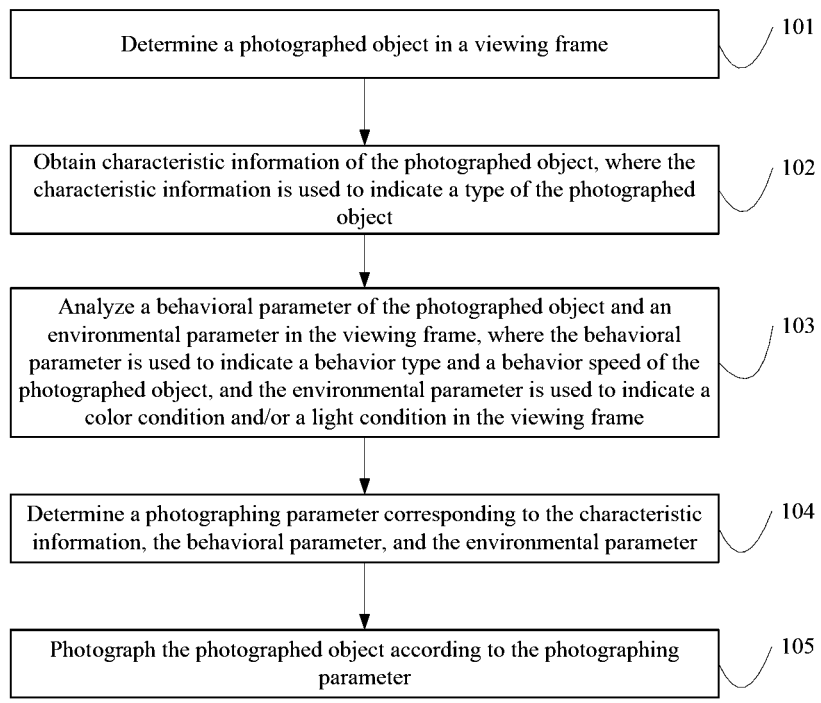
FIG. 1 is a flowchart of a first photographing method according to an embodiment of the present invention.

An embodiment of the present invention provides a photographing method, as shown in FIG. 1, including:

Step 101: Determine a photographed object in a viewing frame.

Before a user presses a shutter to photograph, the user aligns the viewing frame with the photographed object to ensure that the photographed object is in the viewing frame. Before determining the photographed object, the user may first determine, in the viewing frame, a profile of an object in the viewing frame, and then determine the photographed object according to the profile of the object.

Step 102: Obtain characteristic information of the photographed object, where the characteristic information is used to indicate a type of the photographed object.

The type of the photographed object corresponding to the profile can be determined according to the profile of the photographed object determined in step 101. For example, it is determined that a profile of an oval closed curve with a wavy edge is a flower.

Step 103: Analyze a behavioral parameter of the photographed object and an environmental parameter in the viewing frame, where the behavioral parameter is used to indicate a behavior type and a behavior speed of the photographed object, and the environmental parameter is used to indicate a color condition and/or a light condition in the viewing frame.

The behavioral parameter is used to indicate a behavior type and a behavior speed of the photographed object. For example, if the photographed object is an infant, whether the infant is sitting or lying can be analyzed in step 103; and if the infant is lying, whether the infant turns over or lies on one side can be analyzed. The environmental parameter is used to indicate a color condition and/or a light condition in the viewing frame. For example, if a light intensity indicated by the environmental parameter is low, that is, content is dim, light needs to be filled, or exposure time needs to be increased.

Step 104: Determine a photographing parameter that corresponds to the characteristic information, the behavioral parameter, and the environmental parameter.

According to the characteristic information obtained in step 102 and the behavioral parameter and the environmental parameter analyzed in step 103, a photographing parameter that corresponds to the foregoing three parameters is searched for in a preset database, and further, the photographing parameter is determined. The photographing parameter is used to indicate a specific parameter required for photographing, for example, exposure time or a shutter speed.

Step 105: Photograph the photographed object according to the photographing parameter.

The photographed object can be automatically snapped according to the photographing parameter determined in step 104. A main device for photographing may be an independent device, for example, a digital camera or an optical camera, and may also be a photographing unit in another electronic device, for example, a photographing unit in a mobile phone or a photographing unit in a tablet computer.

By using a photographing method provided in the embodiment of the present invention, a photographed object can be determined in a viewing frame before photographing, characteristic information of the photographed object is obtained, and a behavioral parameter of the photographed object and an environmental parameter in the viewing frame are analyzed, a photographing parameter that corresponds to the behavioral parameter of the photographed object and the environmental parameter in the viewing frame is determined, and photographing is performed according to the photographing parameter. In the prior art, because content in the viewing frame cannot be identified, the photographed object cannot be identified. In the present invention, a momentary image is recorded in a photograph manner, and a photograph obtained by photographing can save storage space compared with a recording in the prior art. In addition, the photograph obtained by photographing has a higher resolution than a frame, and thereby definition of the photograph is further improved.

Figure 2:
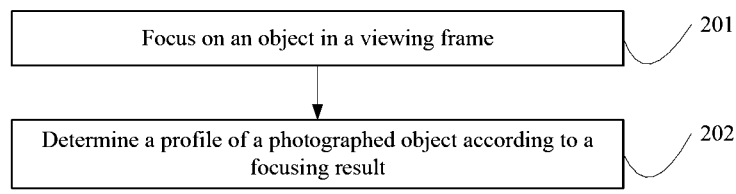
FIG. 2 is a flowchart of a second photographing method according to an embodiment of the present invention.

As further description of the method shown in FIG. 1, an embodiment of the present invention further provides a photographing method. As shown in FIG. 2, step 101 includes:

Step 201: Focus on an object in a viewing frame.

Step 202: Determine a profile of a photographed object according to a focusing result.

Before the photographed object is determined, an object in the viewing frame is first focused on; and after the object is focused on, edges of the object appear. When the object is focused on, the focus may be extended to surrounding sides by using a focus point as a basis point until the focus is extended to the edges of the object. The edges are positions where a depth jumps, and meanwhile whether the focusing is complete can be determined according to fineness of the edges after the focusing. A profile of an additional photographed object is determined according to the edges appearing during the focusing, for example, a human being, a cat, a flower or the like.

Figure 3:
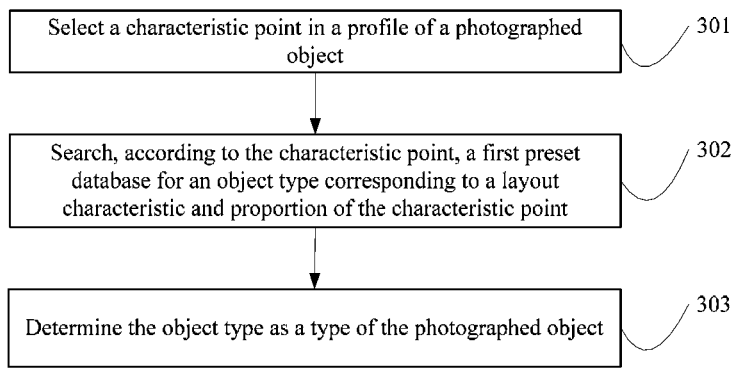
FIG. 3 is a flowchart of a third photographing method according to an embodiment of the present invention.

As further description of the method shown in FIG. 1, an embodiment of the present invention further provides a photographing method. As shown in FIG. 3, step 102 includes:

Step 301: Select a characteristic point in a profile of a photographed object.

Step 302: Search, according to the characteristic point, a first preset database for an object type that corresponds to a layout characteristic and proportion of the characteristic point.

Step 303: Determine the object type as a type of the photographed object.

A point with a particularity is selected in the profile of the photographed object, for example, an angular position, a turning point, or an arc vertex; and then a layout characteristic and proportion of the point with a particularity are analyzed, a record that is highly similar to the layout characteristic and proportion is searched for in the first preset database, and a type of the photographed object is determined according to the record. The first preset database is shown in Table 1, where a correspondence between layout characteristics and proportions of multiple characteristic points and photographed objects is recorded.

TABLE 1

| First preset database | | |
|---|---|---|
| Characteristic point | | |
| Layout characteristic | Proportion | Object type |
| Circular layout | Circle or approximate circle | Sun |
| Human-like layout | Head-to-body ratio 1:5 | Infant |
| Human-like layout | Head-to-body ratio 1:8 | Adult |

Further, based on the determined type of the photographed object, quantity values such as a length, a width, and a radian of the profile may also be determined according to the characteristic point in the profile, and then a size of the photographed object is determined. For example, it can be determined, according to the characteristic point, that the photographed object is a tree, and growth years of the tree can be determined according to a crown-to-trunk ratio of the tree. After the growth years of the tree are determined, colors of the trunk and leaves can be determined.

Figure 4:
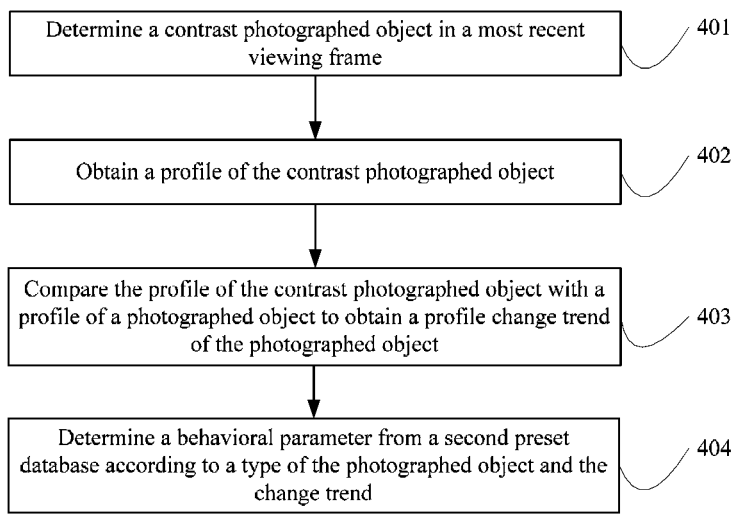
FIG. 4 is a flowchart of a fourth photographing method according to an embodiment of the present invention.

As further description of the method shown in FIG. 1, an embodiment of the present invention further provides a photographing method. As shown in FIG. 4, step 103 includes:

Step 401: Determine a contrast photographed object in a most recent viewing frame.

Step 402: Obtain a profile of the contrast photographed object.

Step 403: Compare the profile of the contrast photographed object with the profile of the photographed object to obtain a profile change trend of the photographed object.

Step 404: Determine a behavioral parameter from a second preset database according to a type of the photographed object and the change trend.

When the behavioral parameter is analyzed, a behavior type and a specific behavior speed of the photographed object need to be determined. For example, if the photographed object is an infant, whether the infant is currently sleeping, eating, or doing something else needs to be analyzed; and if the infant is eating, a chewing speed of the infant and action details of other body parts of the infant need to be analyzed.

A momentary image of the infant before and after one moment is obtained in step 401 and step 402, and a profile change trend of the infant, for example, an opening and closing trend of the mouth, in two consecutive frames is obtained by comparison in step 403; and in step 404, a behavioral parameter that corresponds to the opening and closing trend of the mouth of the infant is determined from the second preset database according to the change trend determined in step 403, where the behavioral parameter is used to indicate that the infant is chewing. The chewing speed of the mouth of the infant may be calculated by dividing a profile position offset of the infant by a time interval between the two frames.

Before step 104 is executed, the following operation needs to be performed: storing, in the second preset database, a correspondence between the characteristic information, the behavioral parameter, and the environmental parameter, and a photographing parameter, so that it is ensured that related information can be found in the second preset database. A same photographed object may correspond to a plurality of behavior types. Table 2 lists behavior types that separately correspond to a child, an infant, a man, a woman, a canine animal, a feline animal, and a bird. It should be noted that in actual application, there are many types of photographed objects involved in this embodiment of the present invention, and the types are not listed one by one herein. The photographed objects listed in Table 2 are merely examples of the photographed objects in this embodiment of the present invention.

TABLE 2

| Photographed object | Behavior type |
|---|---|
| Child | Smiling, laughing, specific actions of four limbs, and the like |
| Infant | Crying, smiling, screaming, and sleeping |
| Man | Male postures such as putting hands in front of the chest and saluting, and some popular postures |
| Woman | Female postures such as a V-shaped gesture, dancing, an S-shaped posture, and some popular postures |
| Canine animal | Sitting, napping, standing, running, and yawning |
| Feline animal | Sitting, sleeping, standing, jumping, yawning, nesting, and screaming |
| Bird | Spreading wings, standing, and crowing |

The behavior type can be determined according to the profile of the photographed object in two consecutive frames, and can also be determined according to the profile of the photographed object in one frame. For example, when corners of the mouth of the infant are up, the infant is laughing; and when corners of the mouth of the infant are down, the infant is crying.

Figure 5:
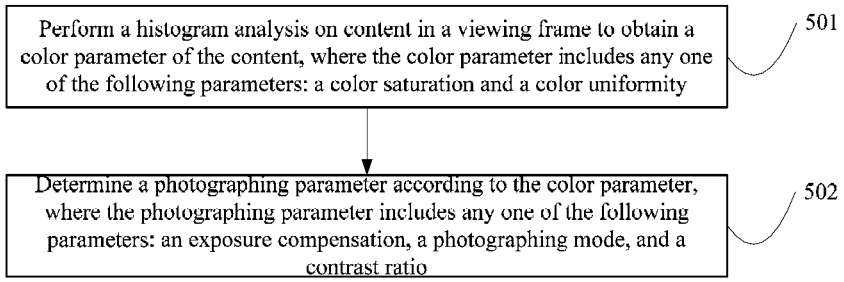
FIG. 5 is a flowchart of a fifth photographing method according to an embodiment of the present invention.

As further description of the method shown in FIG. 1, an embodiment of the present invention further provides a photographing method. As shown in FIG. 5, step 103 further includes:

Step 501: Perform a histogram analysis on content in the viewing frame to obtain a color parameter of the content, where the color parameter includes any one of the following parameters: a color saturation and a color uniformity.

By using the color histogram analysis, a quantitative characteristic related to colors in the viewing frame can be obtained and reflects statistical distribution and basic tones of image colors; and an optimization scheme of the content in the current viewing frame can be calculated according to a color saturation, a color uniformity, and a tone value that are obtained. For example, if the content in the viewing frame is a scene under the hot sun, it can be learnt, by the histogram analysis, that the color saturation of vegetation is low, and a photograph effect may be truer to life after the color saturation is increased. In addition, a light intensity and a light amount can be obtained by a lighting analysis to implement control on the light intensity, light correction, and light reinforcement for the content in the viewing frame. For example, when photographing is performed indoors in the evening, the light is insufficient in the viewing frame and needs to be reinforced. In this case, insufficient indoor light may be overcome by increasing exposure. After the light intensity and the light amount are obtained by the lighting analysis, the light intensity and brightness may also be adjusted according to different photographed objects in an image to take a stylish photograph. For example, if the photographed object is an infant, a color tone may be set to a warm tone to achieve a sense of warmth. If the photographed object is an old house or a man, a color tone may be set to a cool tone to achieve a hoary yet cold effect. In addition, if the photographed object is a human being, whether the human being is crying, smiling, or showing another expression may be analyzed by using a facial expression analysis. Further, after the facial expression analysis, a color parameter of the viewing frame may be obtained by matching a corresponding mode, for example, smile snapshot and skin beautifying.

Step 104 further includes:

Step 502: Determine the photographing parameter according to the color parameter, where the photographing parameter includes any one of the following parameters: an exposure compensation, a photographing mode, and a contrast ratio.

After the color parameter is determined in step 501, a photographing parameter corresponding to the color parameter can be searched for in the second preset database. For example, when the light intensity in the color parameter is relatively low, the exposure compensation in the corresponding photographing parameter is increased. For another example, when it is learnt, by using the facial expression analysis, that a human face is a smiling face, the photographing mode may be set to a red-eye removal mode. For still another example, if the color saturation in the color parameter is relatively high, the contrast may be reduced to prevent an obvious color difference.

The second database stores a correspondence of at least one of the following options: characteristic information, a behavioral parameter, an environmental parameter, and a photographing parameter. The correspondence of the foregoing options may be stored in a data table, and may also be stored in a plurality of relationship tables, where the relationship tables are associated in a mapping manner.

The characteristic information includes at least one of the following options: a type of a photographed object and value information that describes a profile of the photographed object. The behavioral parameter is used to describe a profile change trend of a photographed object, and includes at least one of the following options: a behavior type, a behavior speed, and a behavior direction. The environmental parameter is used to describe a color condition and/or a light condition of an image obtained in a viewing frame, and includes at least one of the following options: a color saturation, a color uniformity, a light intensity, and a contrast ratio. The photographing parameter is used to provide a specific operation index for a photographing device such as a lens during photographing, and includes at least one of the following options: a shutter speed, an aperture size, a light sensitivity, a white balance parameter, an exposure compensation, a photographing mode, and a contrast ratio. The photographing mode further includes at least one of the following options: an RGB color photographing mode, a printing CMYK mode, a macro mode, a still mode, and a continuous capture mode.

To reduce the amount of data searched for each time, when the photographing parameter is determined, records that comply with the type of the photographed object may be first searched for in the second preset database, and then the photographing parameter is selected from the records of this type of photographed object according to the analyzed behavioral parameter and environmental parameter. If a processing capability is strong, the photographing parameter corresponding to the type of the photographed object, the behavioral parameter, and the environmental parameter may also be searched for in the second database at one time.

Further, the photographing parameter includes any one of the following parameters: a shutter speed, an aperture size, a light sensitivity, and a white balance parameter. When a behavior speed value in the behavioral parameter determined in the method shown in FIG. 4 is relatively high, a corresponding shutter speed is relatively high.

As further description of the method shown in FIG. 1, an embodiment of the present invention further provides a photographing method. As shown in FIG. 5, the method further includes:

When the profile of the photographed object in the viewing frame moves, the photographed object is determined in the viewing frame, the characteristic information of the photographed object is obtained, the behavioral parameter and the environmental parameter of the photographed object are analyzed, and the photographing parameter that corresponds to the characteristic information, the behavioral parameter, and the environmental parameter is determined.

The photographed object in the viewing frame is focused on in real time. If the photographed object moves, the determined profile of the object also moves. When the object moves, step 101 to step 104 are repeated. When the photographing parameter that corresponds to the characteristic information, the behavioral parameter, and the environmental parameter of the photographed object after moving is determined in step 104, a photograph of the photographed object is obtained in step 105. When the characteristic information, the behavioral parameter, and the environmental parameter determined in step 101 to step 103 correspond to a record in the second preset database, the photographing parameter can be determined in step 104. For example, when an infant is crawling to a direction of a lens, and a profile of the infant in the viewing frame becomes larger, the infant needs to be focused on again, and a focal length needs to be adjusted. In addition, a corresponding photographing parameter is obtained according to a light condition of the face of the infant and a background color that are obtained in the viewing frame.

Further, if the profile of the photographed object is beyond the viewing frame, prompt information is displayed, so that a user adjusts an angle of view and a coverage of the viewing frame according to the prompt information.

When the profile of the photographed object overlaps an edge of the viewing frame, the prompt information is displayed according to an overlapping position. For example, when an infant crawls from one end of a bed to the other end of the bed, the infant crawls from the left to the right in the viewing frame, and crawls out of the right side of the viewing frame. When the body profile of the infant meets the right side of the viewing frame, a focal length is shortened to ensure that the viewing frame has wider coverage. If the profile of the infant overlaps an edge of the viewing frame after the focal length is shortened, a right arrow is displayed, so that a user adjusts the coverage of the viewing frame.

Further, the method provided in this embodiment of the present invention may be implemented in the background. For example, if a user photographs an infant with a camera, when a program running in the background detects that a posture of the infant is suitable for snapping, the program can automatically obtain a photograph of the infant from the viewing frame, and prompt the user, in a prompt manner, that the photograph is snapped. The user may also trigger, according to a preference of the user, a photograph instruction by using a camera button.

The viewing frame mentioned in this embodiment of the present invention is configured to display an obtained image for a user in real time, and the viewing frame is connected to a device that can shoot an image of an external object, such as a lens, a light sensing device, and an image signal processing (Image Signal Processing, ISP for short) device.

It should be noted that the identification of a photographed object mentioned in this embodiment of the present invention may be identification of a single photographed object in a viewing frame, or may also be identification of a plurality of photographed objects in a viewing frame. For example, when a group photograph is shot, a plurality of photographed objects can be determined in the viewing frame by identifying a plurality of intersecting points and profiles; then a behavioral parameter of each photographed object is analyzed; and further, a photographing parameter can be determined by combining the behavioral parameter and an environmental parameter in the viewing frame. In this way, a snapshot is taken.

The following further describes this embodiment of the present invention by using a scenario in which Zhang San needs to take a photograph of Li Si who jumps and bends knees, and aligns a camera with Li Si. In this case, the camera focuses on Li Si in a viewing frame in real time. When Li Si jumps above the ground, the camera determines, by analysis, that an action of Li Si is jumping and bending knees, and can determine a jumping speed of Li Si according to a profile change trend of Li Si in two consecutive frames. When the profile change trend of Li Si in the two consecutive frames remains unchanged, Li Si jumps to a highest point, photographing parameters such as a shutter speed, a white balance parameter, and an exposure time are determined according to a current background color and a color, and the camera automatically snaps, according to the photographing parameters, a photograph of Li Si when Li Si jumps to the highest point.

By using a photographing method provided in this embodiment of the present invention, firstly, an object in a viewing frame can be focused on before photographing, and then a photographed object is determined according to an image after the focusing. Secondly, a characteristic point is selected in a profile of the photographed object, and a type of the photographed object is determined according to a layout characteristic and proportion of the characteristic point. Thirdly, a contrast photographed object and the photographed object are obtained from most recent two viewing frames, and a profile change trend of the photographed object is determined by comparison, and further, a behavioral parameter of the photographed object is obtained. In addition, a color parameter is obtained in the viewing frame by using an analysis method such as a histogram analysis. Finally, a photographing parameter is determined according to the type of the photographed object and the analyzed behavioral parameter and the color parameter in the viewing frame, and photographing is performed according to the photographing parameter. In the prior art, because content in the viewing frame cannot be identified, the photographed object cannot be identified. In the present invention, a momentary image is recorded in a photograph manner, and a photograph obtained by photographing can save storage space compared with a recording in the prior art. In addition, the photograph obtained by photographing has a higher resolution than a frame, and thereby definition of the photograph is further improved. In addition, by using real-time focusing, the photographed object can be focused on according to a position and a size of the photographed object in the viewing frame, and meanwhile when the photographed object moves outside the viewing frame, a user is prompted, by using prompt information, to adjust the viewing frame, so that the user does not need to keep a close eye on the viewing frame. When the method is used in combination with shutter-type photographing, the photographed object can be snapped in the background, and the foreground normally takes a photograph according to a photographing instruction of the user.

Figure 6:
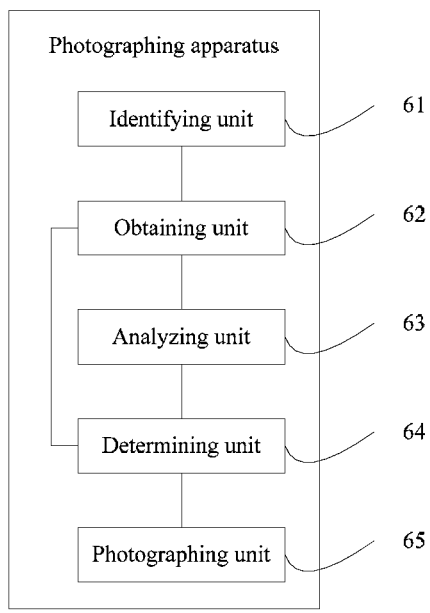
FIG. 6 is a schematic structural diagram of a photographing apparatus according to an embodiment of the present invention.

An embodiment of the present invention further provides a photographing apparatus, as shown in FIG. 6, including:

an identifying unit 61, configured to determine a photographed object in a viewing frame;

an obtaining unit 62, configured to obtain characteristic information of the photographed object determined by the identifying unit 61, where the characteristic information is used to indicate a type of the photographed object;

an analyzing unit 63, configured to analyze a behavioral parameter of the photographed object and an environmental parameter in the viewing frame, where the behavioral parameter is used to indicate a behavior type and a behavior speed of the photographed object, and the environmental parameter is used to indicate a color condition and/or a light condition in the viewing frame;

a determining unit 64, configured to determine a photographing parameter that corresponds to the characteristic information obtained by the obtaining unit 62 and the behavioral parameter and the environmental parameter analyzed by the analyzing unit 63; and a photographing unit 65, configured to photograph the photographed object according to the photographing parameter determined by the determining unit 64.

Before a user presses a shutter to photograph, the user aligns the viewing frame with the photographed object to ensure that the photographed object is in the viewing frame. Before determining the photographed object, the identifying unit 61 may first determine a profile of the photographed object in the viewing frame, and then determine the photographed object according to the profile.

The obtaining unit 62 can determine, according to the profile of the photographed object determined by the identifying unit 61, a type of the photographed object corresponding to the profile. For example, because a profile of a flower has a wavy edge, it is determined that a closed-curve profile with a wavy edge is a flower.

The behavioral parameter is used to describe a moving track and a moving manner of the photographed object. For example, if the photographed object is an infant, the analyzing unit 63 can analyze whether the infant is sitting or lying; and if the infant is lying, the analyzing unit 63 analyzes whether the infant turns over or lies on one side. The environmental parameter is an overall color parameter in the viewing frame. For example, if the color is dim, it can be determined that the infant stays indoors; and in this case, light needs to be filled, or exposure needs to be increased.

The determining unit 64 searches, according to the characteristic information obtained by the obtaining unit 62 and the behavioral parameter and the environmental parameter analyzed by the analyzing unit 63, a preset database for a photographing parameter corresponding to the foregoing three parameters. The photographing parameter is used to indicate a specific parameter required for photographing, for example, an exposure time or a shutter speed.

The photographing unit 65 can automatically snap a photograph of the photographed object according to the photographing parameter determined by the determining unit 64.

The photographing apparatus may be an independent device, for example, a digital camera or an optical camera, and may also be a photographing unit in another electronic device, for example, a photographing unit in a mobile phone or a photographing unit in a tablet computer.

Figure 7:
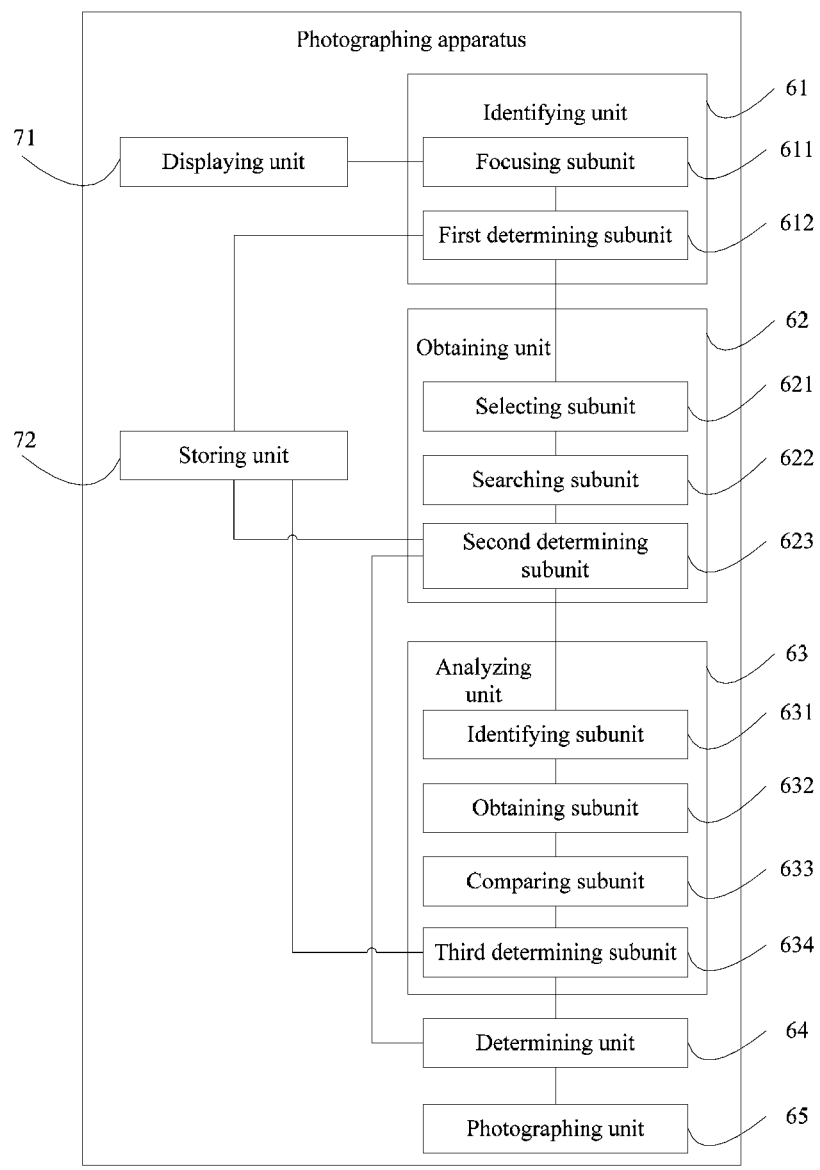
FIG. 7 is a schematic structural diagram of another photographing apparatus according to an embodiment of the present invention.

As further description of the apparatus shown in FIG. 6, an embodiment of the present invention further provides a photographing apparatus. As shown in FIG. 7, the identifying unit 61 includes:

a focusing subunit 611, configured to focus on an object in the viewing frame; and a first determining subunit 612, configured to determine a profile of the photographed object according to a focusing result of the focusing subunit 611.

The obtaining unit 62 includes:

a selecting subunit 621, configured to select a characteristic point in the profile of the photographed object;

a searching subunit 622, configured to search, according to the characteristic point selected by the selecting subunit 621, a first preset database for an object type that corresponds to a layout characteristic and proportion of the characteristic point; and a second determining subunit 623, configured to determine the object type searched by the searching subunit 622 as a type of the photographed object.

The analyzing unit 63 includes:

an identifying subunit 631, configured to determine a contrast photographed object in a most recent viewing frame;

an obtaining subunit 632, configured to obtain a profile of the contrast photographed object determined by the identifying subunit 631;

a comparing subunit 633, configured to compare the profile of the contrast photographed object obtained by the obtaining subunit 632 with the profile of the photographed object obtained by the obtaining unit 62 to obtain a profile change trend of the photographed object; and a third determining subunit 634, configured to determine the behavioral parameter from a second preset database according to the type of the photographed object determined by the second determining subunit 623 and the change trend determined by the comparing subunit 633.

The photographing parameter includes any one of the following parameters:

a shutter speed, an aperture size, a light sensitivity, and a white balance parameter.

The analyzing unit 63 is further configured to perform a histogram analysis on content in the viewing frame to obtain a color parameter of the content, where the color parameter includes any one of the following parameters: a color saturation and a color uniformity.

The determining unit 64 is further configured to determine the photographing parameter according to the color parameter analyzed by the analyzing unit 63, where the photographing parameter includes any one of the following parameters: an exposure compensation, a photographing mode, and a contrast ratio.

The identifying unit 61 is further configured to determine the photographed object in the viewing frame when the profile of the photographed object in the viewing frame moves.

The apparatus further includes:

a displaying unit 71, configured to: when the profile of the photographed object in the viewing frame moves, display prompt information if the profile of the photographed object is beyond the viewing frame, so that a user adjusts an angle of view and a coverage of the viewing frame according to the prompt information; where the profile of the photographed object in the viewing frame may be obtained by the focusing subunit 612 by focusing, and the displaying unit is further configured to display an image of the photographed object in the viewing frame in real time; and a storing unit 72, configured to store, in the second preset database, a correspondence between the characteristic information, the behavioral parameter, and the environmental parameter, and the photographing parameter, where:

the storing unit 72 is further configured to store the first preset database.

By using a photographing apparatus provided in this embodiment of the present invention, firstly, a focusing subunit 611 focuses on an object in a viewing frame before photographing, and a first determining subunit 612 determines a photographed object according to an image after the focusing. Secondly, a selecting subunit 621 selects a characteristic point in a profile of the photographed object, a searching subunit 622 determines a corresponding object type according to a layout characteristic and proportion of the characteristic point, and a second determining subunit 623 determines the object type as a type of the photographed object. Thirdly, an identifying subunit 631 obtains a contrast photographing object from a previous viewing frame, an obtaining subunit 632 obtains the photographed object from a current viewing frame, a comparing subunit 633 determines a profile change trend of the photographed object by comparison, and a third determining subunit 634 obtains a behavioral parameter of the photographed object according to the change trend. In addition, an analyzing unit 63 obtains a color parameter in the viewing frame by using an analysis method such as a histogram analysis. Then a determining unit 64 determines a corresponding photographing parameter according to the type of the photographed object and the analyzed behavioral parameter and color parameter in the viewing frame, and photographs according to the photographing parameter. In the prior art, because content in the viewing frame cannot be identified, the photographed object cannot be identified. In the present invention, a momentary image is recorded in a photograph manner, and a photograph obtained by photographing can save storage space compared with a recording in the prior art. In addition, the photograph obtained by photographing has a higher resolution than a frame, and thereby definition of the photograph is further improved. In addition, an identifying unit 61 can focus on, by using real-time focusing, the photographed object according to a position and a size of the photographed object in the viewing frame; and when the photographed object moves outside the viewing frame, prompt a user, by using prompt information, to adjust the viewing frame, so that the user does not need to keep a close eye on the viewing frame. When the photographing apparatus is used in combination with shutter-type photographing, the photographed object can be snapped in the background, and the foreground normally takes a photograph according to a photographing instruction of the user.

Figure 8:
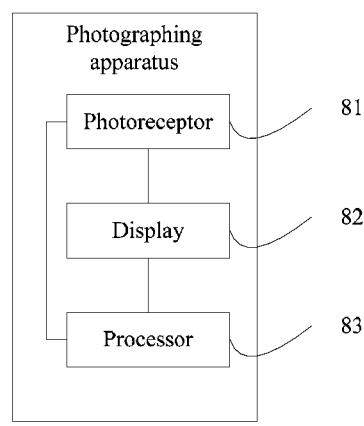
FIG. 8 is a schematic structural diagram of still another photographing apparatus according to an embodiment of the present invention.

An embodiment of the present invention further provides a photographing apparatus, as shown in FIG. 8, including:

a photoreceptor 81, configured to capture an image of an object;

a display 82, configured to display the image captured by the photoreceptor 81 in a viewing frame; and a processor 83, configured to determine a photographed object in the viewing frame;

obtain characteristic information of the photographed object, where the characteristic information is used to indicate a type of the photographed object;

analyze a behavioral parameter of the photographed object and an environmental parameter in the viewing frame, where the behavioral parameter is used to indicate a behavior type and a behavior speed of the photographed object, and the environmental parameter is used to indicate a color condition and/or a light condition in the viewing frame;

determine a photographing parameter that corresponds to the characteristic information, the behavioral parameter, and the environmental parameter; and photograph the photographed object according to the photographing parameter.

Before a user presses a shutter to photograph, the user aligns the photoreceptor 81 with the photographed object, and the photoreceptor 81 displays the image of the photographed object to the user by using the display 82, to ensure that the photographed object is in the viewing frame. Before determining the photographed object, the processor 83 may first determine a profile of the photographed object in the viewing frame, and then determine the photographed object according to the profile. A type of the photographed object corresponding to the profile can be determined according to the determined profile of the photographed object. For example, because a profile of a flower has a wavy edge, it is determined that a closed-curve profile with a wavy edge is a flower.

The behavioral parameter is used to describe a moving track and a moving manner of the photographed object. For example, if the photographed object is an infant, the processor 83 can analyze whether the infant is sitting or lying; and if the infant is lying, the processor 83 analyzes whether the infant turns over or lies on one side. The environmental parameter is an overall color parameter in the viewing frame. For example, if the color is dim, it can be determined that the infant stays indoors; and in this case, light needs to be filled, or exposure needs to be increased.

The processor 83 searches, according to the obtained characteristic information and the analyzed behavioral parameter and environmental parameter, a preset database for a photographing parameter corresponding to the foregoing three parameters, and further determines the photographing parameter. The photographing parameter is used to indicate a specific parameter required for photographing, for example, an exposure time or a shutter speed.

The processor 83 can automatically snap a photograph of the photographed object according to the determined photographing parameter.

The photographing apparatus may be an independent device, for example, a digital camera or an optical camera, and may also be a photographing unit in another electronic device, for example, a photographing unit in a mobile phone or a photographing unit in a tablet computer.

Further, the processor 83 is further configured to focus on an object in the viewing frame; and determine a profile of the photographed object according to a focusing result.

Further, the processor 83 is further configured to select a characteristic point in the profile of the photographed object;

search, according to the characteristic point, a first preset database for an object type that corresponds to a layout characteristic and proportion of the characteristic point; and determine the object type as a type of the photographed object. The photographing parameter includes any one of the following parameters:

a shutter speed, an aperture size, a light sensitivity, and a white balance parameter.

Further, the processor 83 is further configured to determine a contrast photographed object in a most recent viewing frame;

obtain a profile of the contrast photographed object;

compare the profile of the contrast photographed object with the profile of the photographed object to obtain a profile change trend of the photographed object; and determine the behavioral parameter from a second preset database according to the type of the photographed object and the change trend.

Further, the processor 83 is further configured to perform a histogram analysis on content in the viewing frame to obtain a color parameter of the content, where the color parameter includes any one of the following parameters: a color saturation and a color uniformity.

The determining a photographing parameter that corresponds to the characteristic information, the behavioral parameter, and the environmental parameter includes:

determining the photographing parameter according to the color parameter, where the photographing parameter includes any one of the following parameters: an exposure compensation, a photographing mode, and a contrast ratio.

Further, the processor 83 is further configured to: when the profile of the photographed object in the viewing frame moves, determine the photographed object in the viewing frame, obtain the characteristic information of the photographed object, analyze the behavioral parameter and the environmental parameter of the photographed object, and determine the photographing parameter that corresponds to the characteristic information, the behavioral parameter, and the environmental parameter.

Further, the processor 83 is further configured to: when the profile of the photographed object in the viewing frame moves, the display 82 displays prompt information if the profile of the photographed object is beyond the viewing frame, so that a user adjusts an angle of view and a coverage of the viewing frame according to the prompt information.

Further, the processor 83 is further configured to store, in the second preset database, a correspondence between the characteristic information, the behavioral parameter, and the environmental parameter, and the photographing parameter.

By using a photographing apparatus provided in the embodiment of the present invention, firstly, a processor 83 can focus on an object in a viewing frame before photographing, and then determine a photographed object according to an image after the focusing. Secondly, the processor 83 selects a characteristic point in a profile of the photographed object, and determines a type of the photographed object according to a layout characteristic and proportion of the characteristic point. Thirdly, the processor 83 obtains a contrast photographed object and the photographed object from most recent two viewing frames, determines a profile change trend of the photographed object by comparison, and further obtains a behavioral parameter of the photographed object. In addition, the processor 83 obtains a color parameter in the viewing frame by using an analysis method such as a histogram analysis. Then the processor 83 determines a photographing parameter according to the type of the photographed object and the analyzed behavioral parameter and color parameter in the viewing frame, and photographs according to the photographing parameter. In the prior art, because content in the viewing frame cannot be identified, the photographed object cannot be identified. In the present invention, a momentary image is recorded in a photograph manner, and a photograph obtained by photographing can save storage space compared with a recording in the prior art. In addition, a photograph obtained by photographing has a higher resolution than a frame, and thereby definition of the photograph is further improved. In addition, the processor 83 can focus on, by using real-time focusing, the photographed object according to a position and a size of the photographed object in the viewing frame; and when the photographed object moves outside the viewing frame, prompt a user, by using prompt information, to adjust the viewing frame, so that the user does not need to keep a close eye on the viewing frame. When the photographing apparatus is used in combination with shutter-type photographing, the photographed object can be snapped in the background, and the foreground normally takes a photograph according to a photographing instruction of the user.

A person skilled in the art may clearly understand that, for the purpose of convenient and brief description, dividing of the foregoing functional modules is merely used as an example. In actual application, the foregoing function allocation can be completed by different functional modules according to a requirement, that is, an internal structure of an apparatus is divided into different functional modules to perform all or part of the foregoing functions. For a detailed working process of the foregoing system, apparatus, and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, dividing of the modules or units is merely logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A photographing method, comprising:
   determining a photographed object is present in a viewing frame;
   obtaining characteristic information of the photographed object, wherein the characteristic information is used to indicate a type of the photographed object;
   analyzing a behavioral parameter of the photographed object and an environmental parameter in the viewing frame, wherein the behavioral parameter is used to indicate a behavior type and a behavior speed of the photographed object, and the environmental parameter is used to indicate one or more of a color condition and a light condition in the viewing frame;
   determining a photographing parameter that corresponds to the characteristic information, the behavioral parameter, and the environmental parameter; and
   photographing the photographed object according to the photographing parameter,
   wherein analyzing the behavioral parameter comprises:
      determining a contrast photographed object in a most recent viewing frame;
      obtaining a profile of the contrast photographed object;
      comparing the profile of the contrast photographed object with the profile of the photographed object to obtain a profile change trend of the photographed object and
      determining the behavioral parameter from a database according to the type of the photographed object and the change trend.

2. The photographing method according to claim 1, wherein determining the photographed object comprises:
   focusing on an object in the viewing frame; and
   determining a profile of the photographed object according to a result of the focusing.

3. The photographing method according to claim 2, wherein obtaining the characteristic information comprises:
   selecting a characteristic point in the profile of the photographed object;
   searching, according to the characteristic point, a database for an object type that corresponds to a layout characteristic and proportion of the characteristic point; and
   determining the object type as the type of the photographed object.

4. The photographing method according to claim 3, wherein the photographing parameter comprises any one of the following parameters:
   a shutter speed, an aperture size, a light sensitivity, and a white balance parameter.

5. The photographing method according to claim 1,
   wherein analyzing the environmental parameter comprises: performing a histogram analysis on content in the viewing frame to obtain a color parameter of the content, wherein the color parameter comprises at least one of a color saturation and a color uniformity; and
   wherein determining the photographing parameter comprises: determining the photographing parameter according to the color parameter, wherein the photographing parameter comprises at least one of the following parameters: an exposure compensation, a photographing mode, and a contrast ratio.

6. The photographing method according to claim 2, wherein the method further comprises:
   when the profile of the photographed object in the viewing frame moves, determining the photographed object in the viewing frame, obtaining the characteristic information of the photographed object, analyzing the behavioral parameter and the environmental parameter of the photographed object, and determining the photographing parameter that corresponds to the characteristic information, the behavioral parameter, and the environmental parameter.

7. The photographing method according to claim 6, wherein the method further comprises:
   in response to determining that the profile of the photographed object is beyond the viewing frame, displaying prompt information, so that a user adjusts an angle of view and a coverage of the viewing frame according to the prompt information.

8. The photographing method according to claim 1, wherein the method further comprises:
   storing, in a database, a correspondence between the characteristic information, the behavioral parameter, and the environmental parameter, and the photographing parameter.

9. A photographing apparatus, comprising a processor and a non-transitory computer readable medium, the non-transitory computer readable medium storing instructions that when executed by the processor cause the processor to:
   determine a photographed object is present in a viewing frame;
   obtain characteristic information of the photographed object, wherein the characteristic information is used to indicate a type of the photographed object;
   analyze a behavioral parameter of the photographed object and an environmental parameter in the viewing frame, wherein the behavioral parameter is used to indicate a behavior type and a behavior speed of the photographed object, and the environmental parameter is used to indicate one or more of a color condition and a light condition in the viewing frame;
   determine a photographing parameter that corresponds to the characteristic information and the behavioral parameter and the environmental parameter; and
   photograph the photographed object according to the photographing parameter,
   wherein when the processor is caused to analyze the behavioral parameter of the photographed object, the processor is further caused to:
   determine a contrast photographed object in a most recent viewing frame;
   obtain a profile of the contrast photographed object;
   compare the profile of the contrast photographed object with the profile of the photographed object to obtain a profile change trend of the photographed object; and
   determine the behavioral parameter from a second preset database according to the type of the photographed object and the change trend.

10. The photographing apparatus according to claim 9, wherein when the processor is caused to determine the photographed object is present in the viewing frame, the processor is further caused to:
    focus on an object in the viewing frame; and
    determine a profile of the photographed object according to a focusing result of the focusing subunit.

11. The photographing apparatus according to claim 10, wherein when the processor is caused to obtain the characteristic information of the photographed objected, the processor is further caused to:
  select a characteristic point in the profile of the photographed object;
  search, according to the characteristic point, a database for an object type that corresponds to a layout characteristic and proportion of the characteristic point; and
  determine the object type as the type of the photographed object.

12. The photographing apparatus according to claim 9, wherein the processor is further caused to:
  perform a histogram analysis on content in the viewing frame to obtain a color parameter of the content, and the color parameter comprises any one of the following parameters: a color saturation and a color uniformity; and
  determine the photographing parameter according to the color parameter, wherein the photographing parameter comprises any one of the following parameters: an exposure compensation, a photographing mode, and a contrast ratio.

13. The photographing apparatus according to claim 10, wherein the processor is further caused to determine the photographed object in the viewing frame when the profile of the photographed object in the viewing frame moves.

14. The photographing apparatus according to claim 13, wherein the processor is further caused to:
  display prompt information when the profile of the photographed object is beyond the viewing frame, so that a user adjusts an angle of view and a coverage of the viewing frame according to the prompt information.

15. The photographing apparatus according to claim 9, wherein the processor is further caused to:
  a storing unit, configured to store, in a database, a correspondence between the characteristic information, the behavioral parameter, and the environmental parameter, and the photographing parameter.

\* \* \* \* \*